(12) United States Patent
Obara et al.

(10) Patent No.: US 10,910,844 B2
(45) Date of Patent: Feb. 2, 2021

(54) VEHICLE AND SETTLEMENT SYSTEM

(71) Applicant: TOYOTA JIDOSHA KABUSHIKI KAISHA, Aichi-ken (JP)

(72) Inventors: Ryohei Obara, Nagakute (JP); Masaki Ito, Toyota (JP); Makoto Kakuchi, Toyota (JP); Mutsumi Matsuura, Okazaki (JP); Hiroaki Sugiyama, Nagoya (JP); Yuichi Tashiro, Owariasahi (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/582,506

(22) Filed: Sep. 25, 2019

(65) Prior Publication Data

US 2020/0161884 A1    May 21, 2020

(30) Foreign Application Priority Data

Nov. 15, 2018 (JP) .................................. 2018-214914

(51) Int. Cl.
*H02J 7/00* (2006.01)
*G06Q 20/14* (2012.01)
*B60R 16/02* (2006.01)

(52) U.S. Cl.
CPC ................ *H02J 7/00* (2013.01); *B60R 16/02* (2013.01); *G06Q 20/145* (2013.01)

(58) Field of Classification Search
CPC ......... H02J 7/00; B60R 16/02; G06Q 20/145; G06Q 20/14
See application file for complete search history.

(56) References Cited

FOREIGN PATENT DOCUMENTS

JP        2009-295077 A      12/2009

OTHER PUBLICATIONS

Ministry of Land, Infrastructure, Transport and Tourism, "About ultra small mobility", [online], [Searched on Nov. 5, 2018], <URL:https://www.mlit.go.jp/jidosha/jidosha_fr1_000043.html>, 3pp.

*Primary Examiner* — Robert L Deberadinis
(74) *Attorney, Agent, or Firm* — Hauptman Ham, LLP (57) ABSTRACT

A vehicle includes a supply unit supplying electric power to a target apparatus, a first reception unit receiving settlement information including an amount of charge to be charged to a user as value for a service provided by the target apparatus, from the target apparatus being supplied with electric power, a first transmission unit transmitting the settlement information and a user identifier to a settlement apparatus, a second reception unit receiving a notification indicating that settlement of the amount of charge is possible or settlement of the amount of charge has been completed from the settlement apparatus, and a second transmission unit transmitting information indicating that settlement of the amount of charge is possible or settlement of the amount of charge has been completed to the target apparatus so as to cause the target apparatus to execute the service in a case where the notification is received.

6 Claims, 7 Drawing Sheets

VEHICLE AND SETTLEMENT SYSTEM

INCORPORATION BY REFERENCE

The disclosure of Japanese Patent Application No. 2018-214914 filed on Nov. 15, 2018 including the specification, drawings and abstract is incorporated herein by reference in its entirety.

BACKGROUND

1. Technical Field

The present disclosure relates to a vehicle and a settlement system.

2. Description of Related Art

At present, there is a micro-vehicle called a micro-mobility that is more compact than a general automobile and of which a riding capacity is substantially one or two persons. The micro-mobility is excellent in environmental performance, and is thus expected to become spread as convenient transportation means in a community.

SUMMARY

In the near future, a vehicle such as a micro-mobility is deployed not only in an urban area but also in a rural area, and is thus examined to be used as major transportation means in a place where traffic is inconvenient.

Here, a vending machine is provided in a rural area, but the rural area has a small population, and thus there are few people using the vending machine. The vending machine needs to receive external power in order to perform a charging process or the like, but it is considered to be inefficient to always supply electric power to the vending machine despite a low usage frequency thereof. The same problem is not limited to a vending machine, and may occur in all apparatuses that are supplied with external electric power and provide services to users.

Therefore, the present disclosure provides a vehicle that can supply electric power to an external apparatus providing a service to a user.

A first aspect of the present disclosure relates to a vehicle including a supply unit, a first reception unit, a first transmission unit, a second reception unit, and a second transmission unit. The supply unit is configured to supply electric power to a target apparatus. The first reception unit is configured to receive settlement information including an amount of charge to be charged to a user as value for a service provided to the user by the target apparatus, from the target apparatus that is being supplied with the electric power. The first transmission unit is configured to transmit the acquired settlement information and a user identifier for specifying the user to a settlement apparatus. The second reception unit is configured to receive a notification indicating that settlement of the amount of charge is possible or settlement of the amount of charge has been completed from the settlement apparatus. The second transmission unit is configured to transmit information indicating that settlement of the amount of charge is possible or settlement of the amount of charge has been completed to the target apparatus so as to cause the target apparatus to execute the service in a case where the notification is received.

According to the aspect of the present disclosure, it is possible to provide a vehicle capable of supplying electric power to an external apparatus that provides a service to a user.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

An embodiment of the present disclosure will be described with reference to the accompanying drawings. Throughout the drawings, a constituent element given the same reference numeral has an identical or similar configuration.

<System Configuration>

Figure 1:
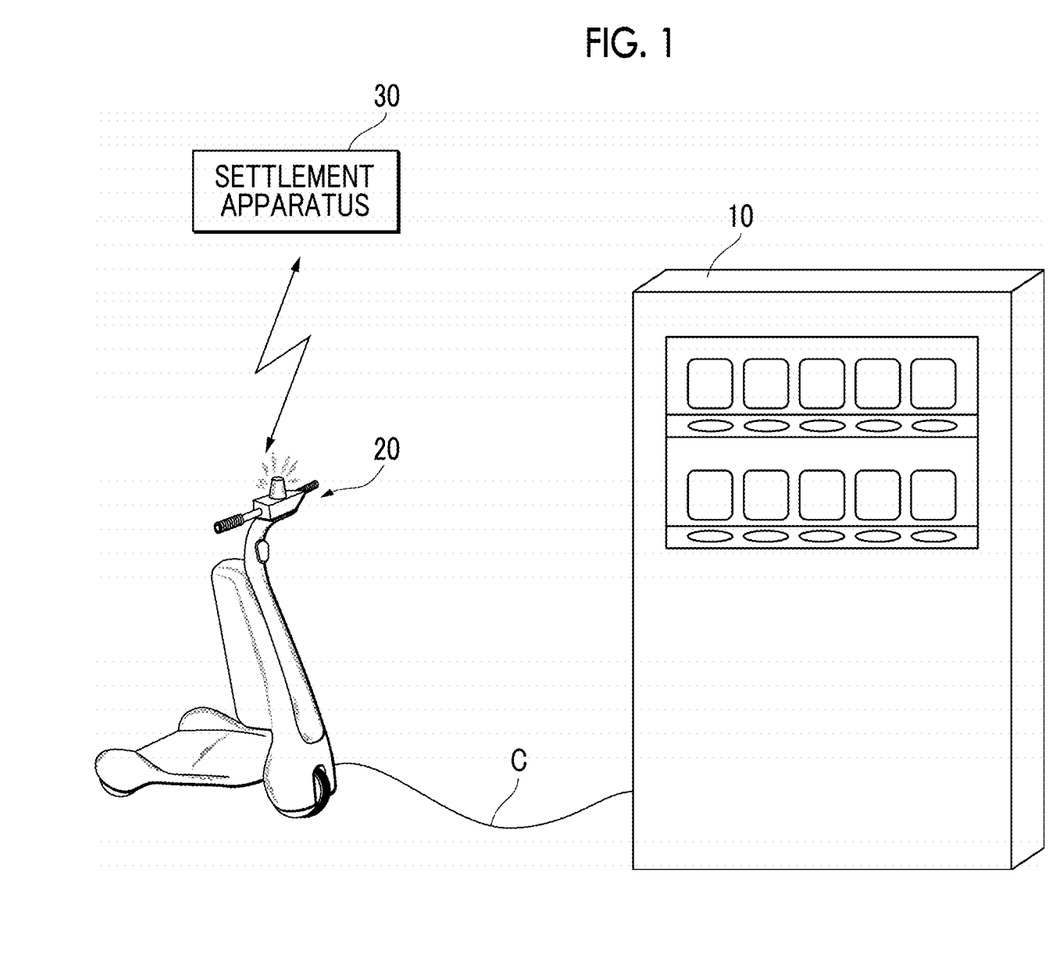
FIG. 1 is a diagram illustrating a configuration example of a settlement system according to the present embodiment.

FIG. 1 is a diagram illustrating a configuration example of a settlement system 1 according to the present embodiment. The settlement system 1 includes a target apparatus 10, a vehicle 20, and a settlement apparatus 30. The vehicle 20 and the settlement apparatus 30 may perform communication with each other through wireless communication. The target apparatus 10 and the vehicle 20 may perform communication with each other via a cable C for the supply of power (hereinafter, referred to as a "cable C"). For convenience of illustration, each of the target apparatus 10 and the vehicle 20 is illustrated alone in FIG. 1, but may be provided in a plurality.

The target apparatus 10 is an apparatus as a target to which the vehicle 20 supplies electric power, and is operated by being supplied with electric power from the vehicle 20 via the cable C, and provides a predetermined service to a user while the electric power is being supplied. The predetermined service may be any service, but may be, for example, provision of an article or a service enabling a function of the target apparatus 10 to be used. Specific examples of the target apparatus 10 may include a vending machine provided on the street, and a refrigerator, a heater, and a lighting provided in a leisure facility such as a campsite. FIG. 1 illustrates a case where the target apparatus 10 is a vending machine. In the following description, for convenience of the description, the target apparatus 10 is assumed to be a vending machine. In the following description, the term "article" is assumed to include a service unless otherwise mentioned.

The vehicle 20 is mounted with a battery, and is, for example, a micro-mobility that is generally moved with power of a motor. The micro-mobility is a micro-vehicle that is more compact than a general automobile and of which a riding capacity is substantially one or two persons. The vehicle 20 has a physical connector used to supply electric power to the target apparatus 10, and may supply electric power to the target apparatus 10 through coupling between the physical connector and the target apparatus 10 using the cable C. The vehicle 20 is not limited to the micro-mobility illustrated in FIG. 1. The vehicle 20 according to the present embodiment may be any vehicle regardless of a shape or a riding capacity as long as the vehicle can supply electric power to the target apparatus 10.

The settlement apparatus 30 is an apparatus that performs a settlement process regarding money paid by a user when the user receives a service from the target apparatus 10. The settlement process performed by the settlement apparatus 30 may be a prepaid method and may be a postpaid method. In a case where the settlement apparatus 30 receives settlement information including an amount of charge to be charged to a user from the target apparatus 10 via the vehicle 20, the settlement apparatus 30 settles an amount of money corresponding to the amount of charge from an account of the user.

<Configuration of Target Apparatus>

Figure 2:
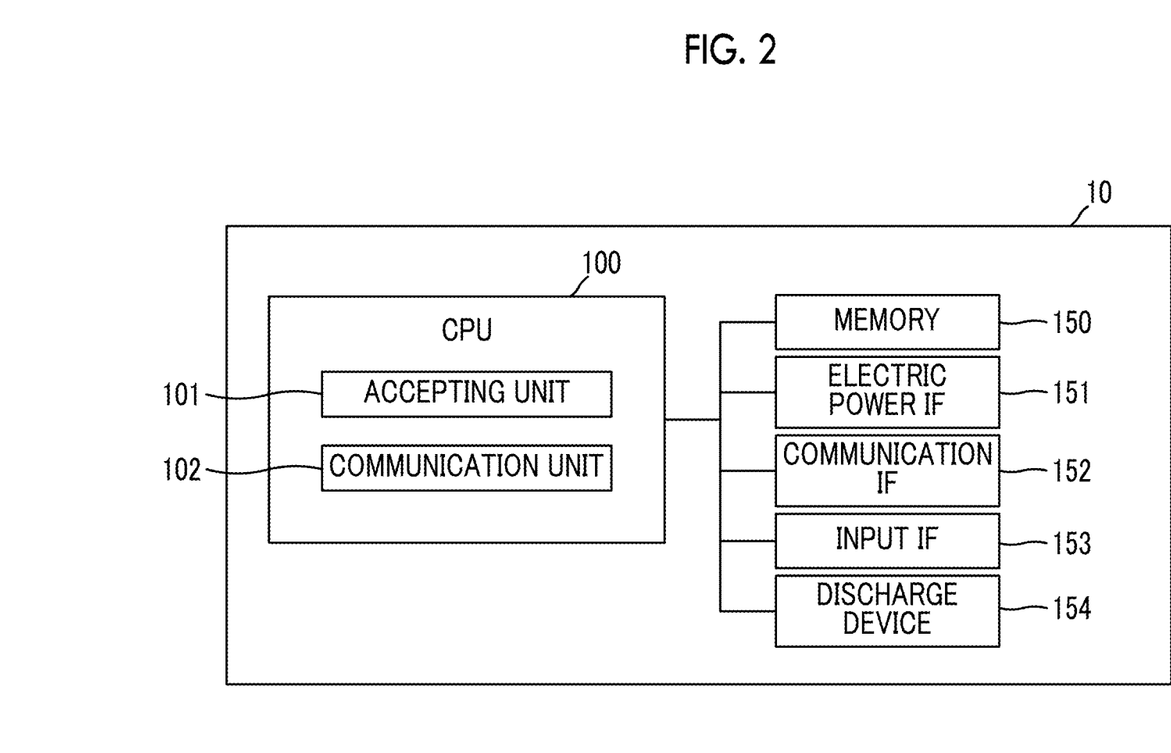
FIG. 2 is a diagram illustrating an example of a configuration of a target apparatus according to the present embodiment.

FIG. 2 is a diagram illustrating an example of a configuration of the target apparatus 10 according to the present embodiment. The target apparatus 10 includes a central processing unit (CPU) 100, a memory 150, an electric power interface (IF) 151 supplied with electric power from the vehicle 20, a communication IF 152 performing communication with the vehicle 20, an input IF 153 such as an article selection button accepting input from a user, and a discharge device 154 transporting an article selected by a user to a takeout port. The discharge device 154 may be omitted, and may be any device or mechanism as long as the device or the mechanism is used for the target apparatus 10 to provide a service. The electric power IF 151 and the communication IF 152 may be incorporated into a part of the physical connector used for connection to the cable C. The memory 150 stores an identifier (hereinafter, referred to as a "target apparatus ID") for the settlement apparatus 30 uniquely identifying the target apparatus 10, a price of an article provided by the target apparatus 10, and the like.

An accepting unit 101 and a communication unit 102 may be realized by the CPU 100 of the target apparatus 10 executing a program stored in the memory 150. The program may be stored in a storage medium. The storage medium storing the program may be a non-transitory computer readable medium.

The accepting unit 101 accepts a user's operation via the input IF 153, and thus accepts selection of an article or a service purchased by the user.

The communication unit 102 transmits, to the vehicle 20, an article identifier for identifying an article that is selected by a user in the accepting unit 101, and settlement information including an amount of charge, corresponding to a price of the article, to be charged to the user.

<Configuration of Vehicle>

Figure 3:
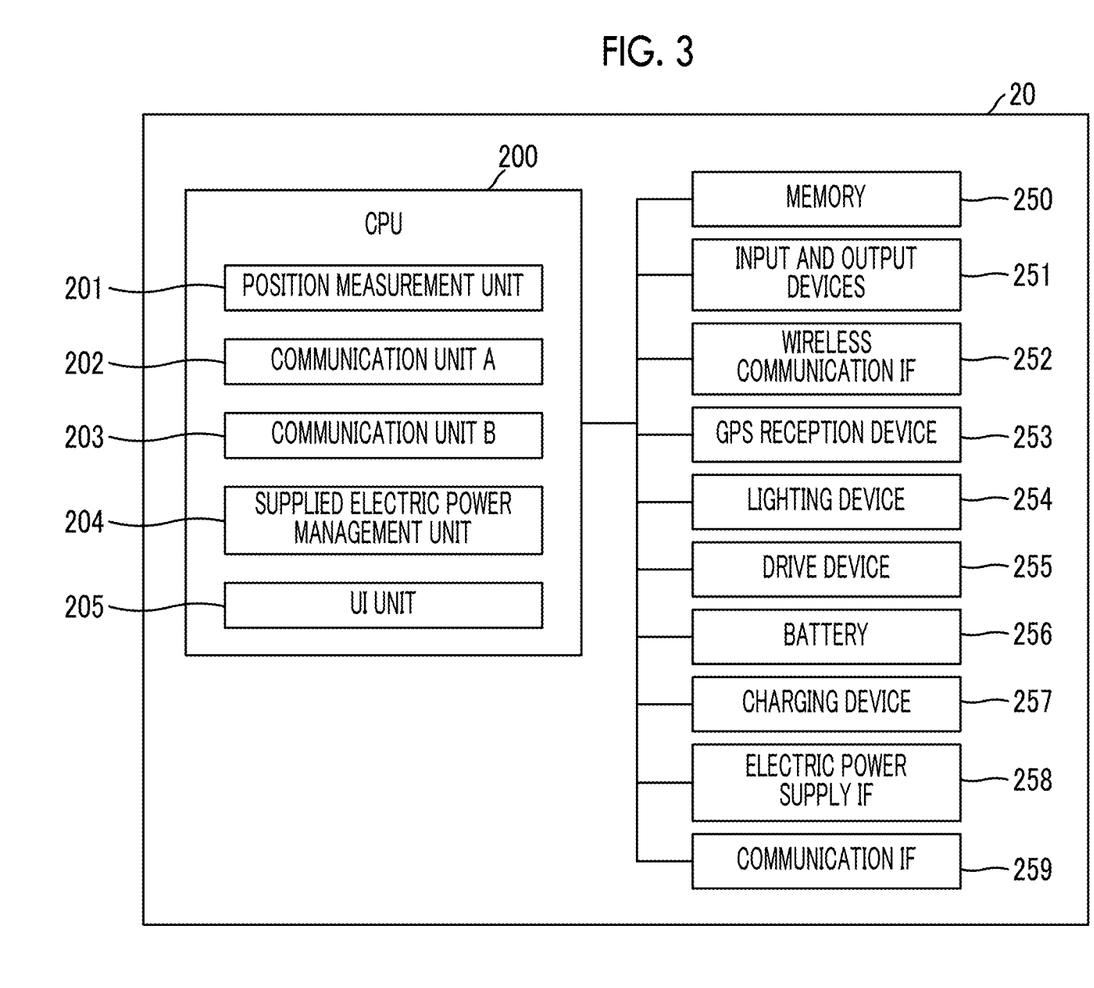
FIG. 3 is a diagram illustrating an example of an apparatus configuration of a vehicle according to the present embodiment.

FIG. 3 is a diagram illustrating an example of an apparatus configuration of the vehicle 20 according to the present embodiment. The vehicle 20 includes a CPU 200, a memory 250, input and output devices 251, a wireless communication IF 252 performing communication with the settlement apparatus 30, a GPS reception device 253 receiving a signal of a GPS satellite, a lighting device 254, a drive device 255, a battery 256, a charging device 257, an electric power supply IF 258 (supply unit) supplying electric power to the target apparatus 10, and a communication IF 259 performing communication with the target apparatus 10.

The input and output devices 251 include input devices (for example, a touch panel and a microphone) accepting various operations from a user riding on the vehicle 20 and output devices (for example, a display and a speaker) outputting information. The electric power supply IF 258 and the communication IF 259 may be incorporated into a part of the physical connector used for connection to the cable C.

A position measurement unit 201, a communication unit A 202, a communication unit B 203, a supplied electric power management unit 204, and a user interface (UI) unit 205 may be realized by the CPU 200 of the vehicle 20 executing a program stored in the memory 250. The program may be stored in a storage medium. The storage medium storing the program may be a non-transitory computer readable medium. The non-transitory computer readable medium is not particularly limited, but may be a storage medium such as a USB memory or a CD-ROM.

The position measurement unit 201 has a function of acquiring the current position of the vehicle 20 by using the GPS reception device 253.

The communication unit A 202 has a function of transmitting and receiving data to and from the target apparatus 10 via the communication IF 259. For example, the communication unit A 202 (first reception unit) receives information (hereinafter, referred to as "settlement information") indicating an amount to be charged to a user as value for a service performed by the target apparatus 10, from the target apparatus 10 that is being supplied with electric power. In a case where a notification indicating that settlement of an amount of charge is possible or settlement of an amount of charge has been completed is received from the settlement apparatus 30, the communication unit B 203 (second transmission unit) which will be described later transmits information indicating that settlement of an amount of charge is possible or settlement of an amount of charge has been completed to the target apparatus 10 in order to cause the target apparatus 10 to execute a service.

The communication unit B 203 has a function of transmitting and receiving data to and from the target apparatus 10 via the wireless communication IF 252. For example, the communication unit B 203 (first transmission unit) transmits settlement information acquired from the target apparatus 10 by the communication unit A 202 and an identifier (hereinafter, referred to as a "user ID") for specifying a user receiving provision of a service, to the settlement apparatus 30. The communication unit B 203 (second reception unit) receives a notification indicating that settlement of an amount of charge is possible or settlement of an amount of charge has been completed from the settlement apparatus 30.

The supplied electric power management unit 204 has a function of counting an amount of electric power supplied to the target apparatus 10 via the electric power supply IF 258 in order to receive a service from the target apparatus 10.

The UI unit 205 has a function of accepting various operations from a user via the input and output devices 251 such as a touch panel and a function of displaying data (for example, completion of charging) to be notified by the user.

<Configuration of Settlement Apparatus>

Figure 4:
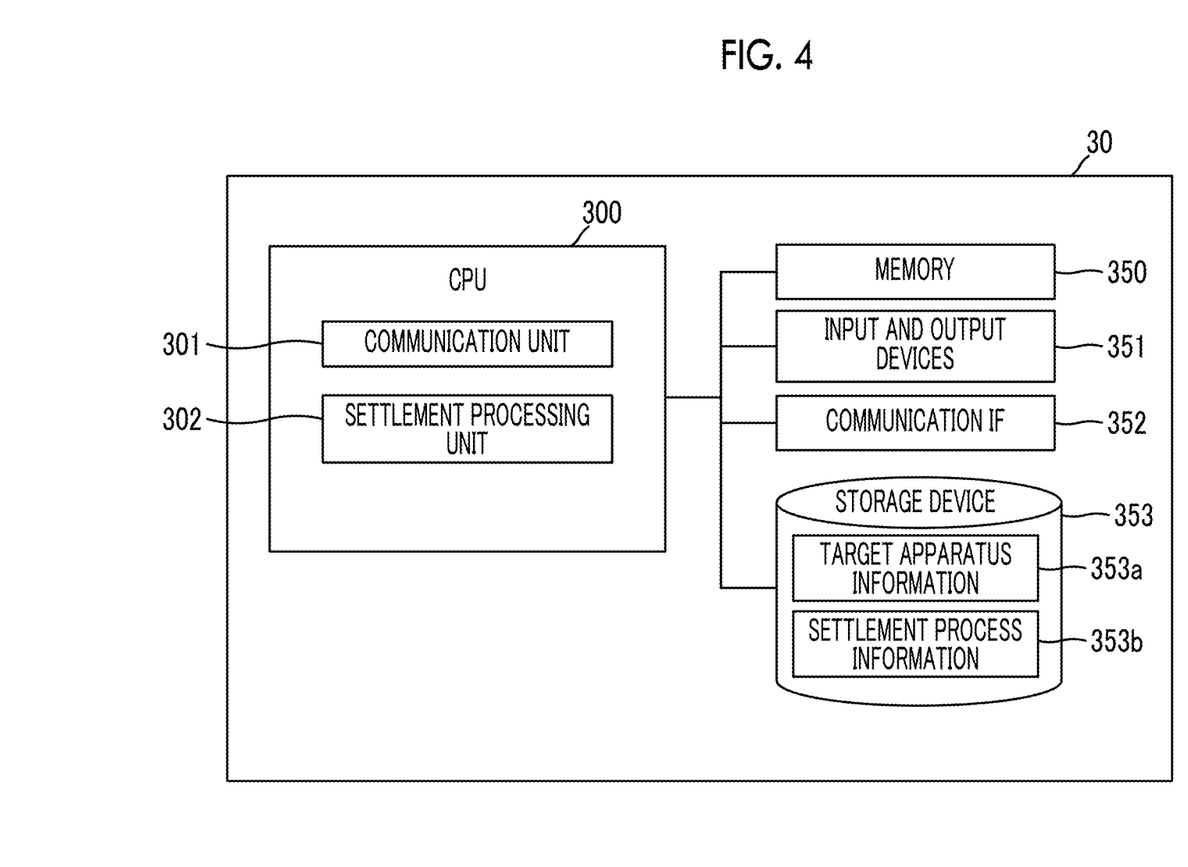
FIG. 4 is a diagram illustrating an example of a configuration of a settlement apparatus according to the present embodiment.

FIG. 4 is a diagram illustrating an example of a configuration of the settlement apparatus 30 according to the present embodiment. The settlement apparatus 30 includes a CPU 300, a memory 350, input and output devices 351 (for example, a touch panel, a microphone, a speaker, and a keyboard), a communication IF 352, and a storage device 353. The storage device 353 stores target apparatus information 353a and settlement process information 353b. The target apparatus information 353a includes various pieces of information for managing the target apparatus 10, such as a target apparatus ID, an identifier indicating an owner managing the target apparatus 10, and an installation place of the target apparatus 10. The settlement process information 353b stores information needed to settle an amount of charge for each user. For example, the settlement process information includes a credit card number, a bank account number, or an account for prepaid settlement of a user.

A communication unit 301 and a settlement processing unit 302 may be realized by the CPU 300 of the settlement apparatus 30 executing a process stored in the memory 350. The program may be stored in a storage medium. The storage medium storing the program may be a non-transitory computer readable medium. The non-transitory computer readable medium is not particularly limited, but may be a storage medium such as a USB memory or a CD-ROM.

The communication unit 301 has a function of transmitting and receiving data to and from the vehicle 20 via the communication IF 352. For example, the communication unit 301 (third reception unit) receives settlement information and a user ID from the vehicle 20.

The settlement processing unit 302 compares an amount of charge included in settlement information with a payment ability of a user corresponding to a user ID, and, in a case where the payment ability is equal to or more than the amount of charge, determines that the user can pay the amount of charge (that is, settlement is possible). In a case where the settlement processing unit 302 determines that the user can pay the amount of charge, the settlement processing unit 302 settles the amount of charge from a bank account or a credit card of the user. In this case, the communication unit 301 (third transmission unit) transmits a notification indicating that the user can settle the amount of charge or settlement of the amount of charge of the user is completed, to the vehicle 20.

<Process Procedure>

Figure 5:
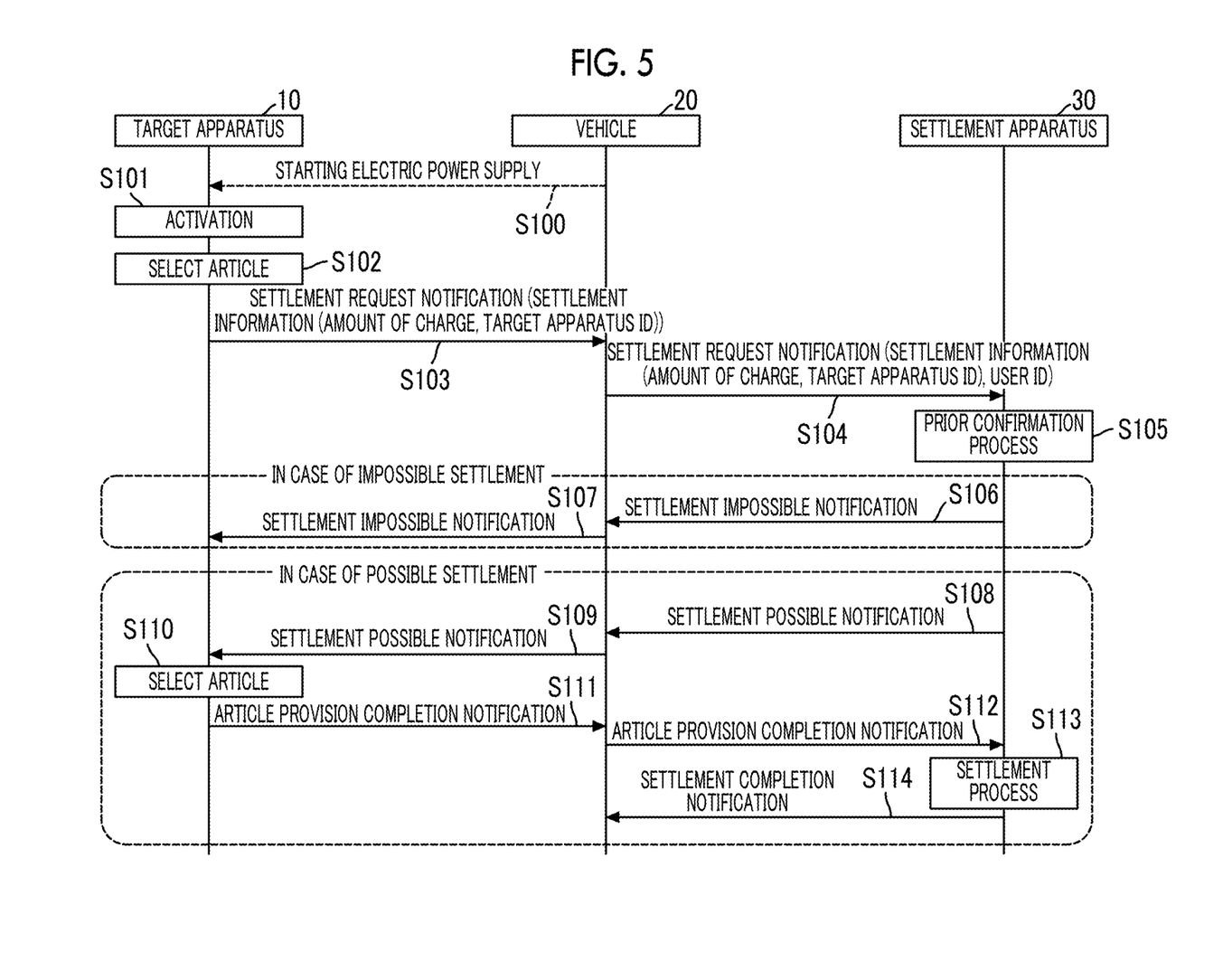
FIG. 5 is a sequence diagram illustrating an example of process procedures performed by the settlement system.

FIG. 5 is a sequence diagram illustrating an example of process procedures performed by the settlement system 1. With reference to FIG. 5, a description will be made of a series of process procedures from starting of the supply of electric power to the target apparatus 10 to reception of an article from the target apparatus 10.

First, a user riding on the vehicle 20 couples the cable C to the target apparatus 10 (S100). Consequently, the supply of electric power to the target apparatus 10 is started, and thus the target apparatus 10 is activated (S101). When the target apparatus 10 is activated, the accepting unit 101 of the target apparatus 10 accepts selection of an article from the user (S102).

Next, the communication unit 102 of the target apparatus 10 transmits a settlement request notification including settlement information to the vehicle 20 (S103). The settlement information includes an amount of charge corresponding to a price of the article selected by the user and a target apparatus ID of the target apparatus 10.

Next, the communication unit B 203 of the vehicle 20 transmits a settlement request notification including the settlement information included in the settlement request notification received from the target apparatus 10 and a user ID of the user receiving a service from the target apparatus 10, to the settlement apparatus 30 (S104). Here, the UI unit 205 of the vehicle 20 may accept input of the user ID of the user receiving the service, store the accepted user ID into the settlement request notification, and transmit the settlement request notification to the settlement apparatus 30. For example, in a case where two persons are riding on the vehicle 20, a user ID of a user purchasing an article may be input on a screen of the vehicle 20. In a case where a single user is riding on the vehicle 20, a user ID of a user driving the vehicle 20 may be stored in a settlement request notification instead of accepting input of the user ID.

Next, the settlement processing unit 302 of the settlement apparatus 30 accesses the settlement process information 353b, and checks whether or not the user corresponding to the user ID included in the settlement request notification has a payment ability (S105). For example, the settlement processing unit 302 may check whether or not an amount of charge can be withdrawn with a system managing a bank account of the user, and may check whether or not the amount of charge can be settled with a system managing a credit card of the user.

In a case where the user does not have a payment ability for the amount of charge, the communication unit 301 of the settlement apparatus 30 transmits a settlement impossible notification indicating that settlement is not possible to the vehicle 20 (S106). Next, the communication unit A 202 of the vehicle 20 transmits the settlement impossible notification indicating that settlement is not possible to the target apparatus 10 (S107). When the target apparatus 10 receives the settlement impossible notification, the target apparatus 10 finishes the process without discharging an article to the takeout port.

In a case where the user has a payment ability for the amount of charge, the communication unit 301 of the settlement apparatus 30 transmits a settlement possible notification indicating that settlement is possible to the vehicle 20 (S108). Next, the communication unit A 202 of the vehicle 20 transmits the settlement possible notification indicating that settlement is possible to the target apparatus 10 (S109). The UI unit 205 of the vehicle 20 may display the amount of charge (settlement amount) received in step S103 on the display of the vehicle 20. Consequently, the user of the vehicle 20 can check determines whether or not the amount of charge displayed on the vehicle 20 matches an amount of money displayed on the target apparatus 10.

In a case where the UI unit 205 accepts input of a result of checking that the amount of charge is accurate from the user, and input of the amount of charge being accurate in the UI unit 205 is received, the communication unit A 202 may transmit a settlement possible notification to the target apparatus 10. Consequently, in a case where an amount of charge displayed on the vehicle 20 does not match a price of an article displayed on the target apparatus 10, the user of the vehicle 20 can reject settlement, and thus a feeling of security of the user can be increased.

Next, when the settlement possible notification is received, the discharge device 154 of the target apparatus 10 provides a service to the user (for example, provides an article to the user by discharging the article to the takeout port) (S110). The communication unit 102 of the target apparatus 10 transmits a notification indicating that provision of the article has been completed to the vehicle 20 (S111), and the communication unit B 203 of the vehicle 20 transmits the notification indicating that provision of the article has been completed to the settlement apparatus 30 (S112).

Next, the settlement processing unit 302 of the settlement apparatus 30 performs a process of actually settling the amount of charge from the bank account or the credit card of the user (S113). For example, the settlement processing unit 302 may instruct the system managing the bank account of the user to withdraw the amount of charge, and may instruct the system managing the credit card of the user to settle the amount of charge. The settlement processing unit 302 may specify an owner of the target apparatus 10 based on the target apparatus ID received in the process procedure of step S104, and may transfer the amount of money paid by the user to a bank account of the owner. When the settlement is completed, the settlement processing unit 302 notifies the vehicle 20 of completion of the settlement (S114).

Figure 6:
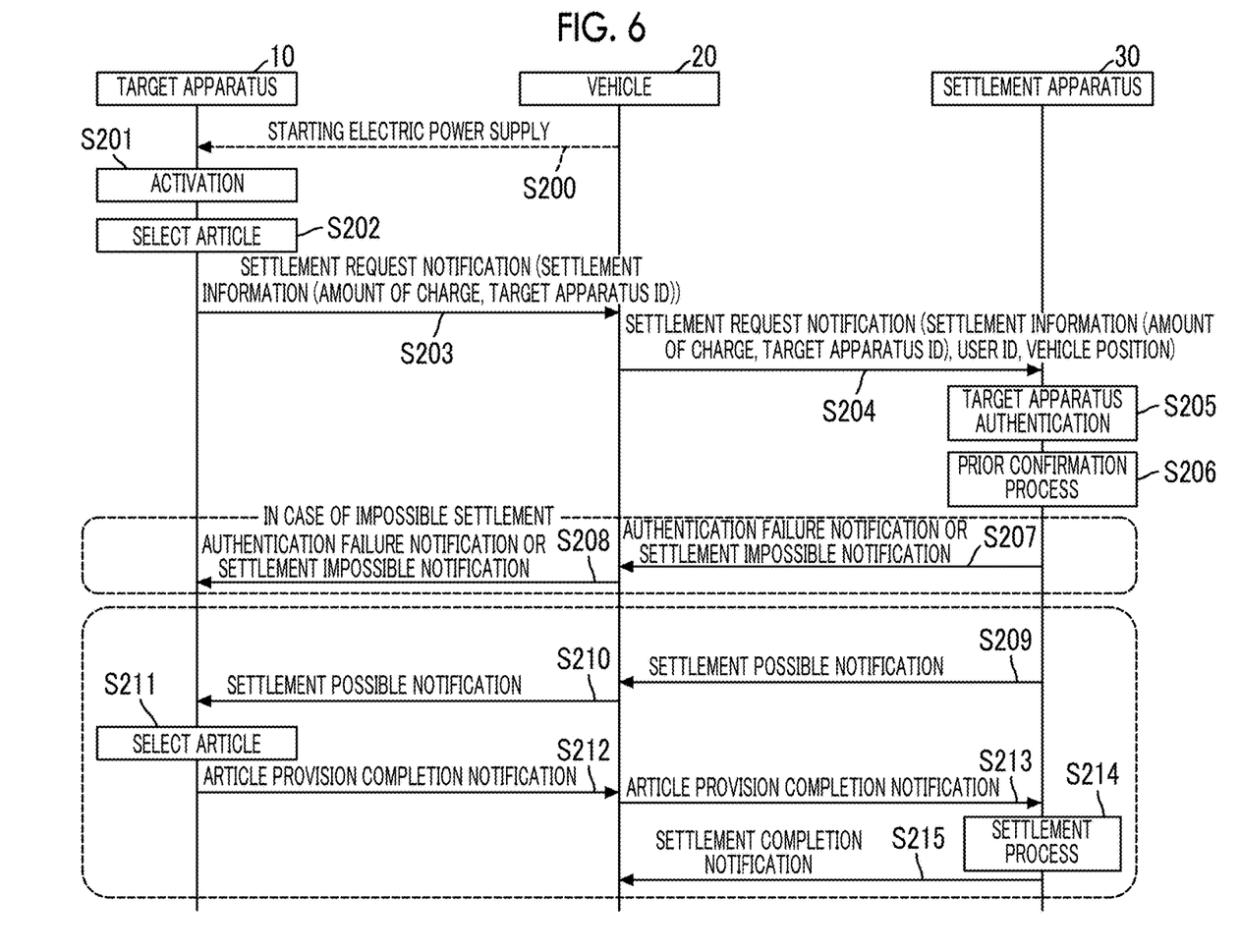
FIG. 6 is a sequence diagram illustrating an example of a process procedure performed by the settlement system.

FIG. 6 is a sequence diagram illustrating an example of a process procedure performed by the settlement system 1. In the example illustrated in FIG. 6, the settlement apparatus 30 stores in advance information indicating an installation place where the target apparatus 10 is provided, and authenticates whether or not the target apparatus 10 is provided at a normal place by collating the information with the current position of the vehicle 20 sent from the vehicle 20. Consequently, a user can be prevented from being involved in any trouble due to reception of the provision of a service from the target apparatus 10 installed illegally or the target apparatus 10 moved from an original installation position by mischief or the like. A portion not particularly described in the following description may be the same as that in FIG. 5.

The process procedures of step S200 to step S203 are respectively the same as process procedures of step S100 to step S103 in FIG. 5, and thus descriptions thereof will not be repeated.

Next, the position measurement unit 201 of the vehicle 20 measures the current position of the vehicle 20 in a case where electric power is supplied to the target apparatus 10. Next, the communication unit B 203 of the vehicle 20 transmits a settlement request notification including the settlement information included in the settlement request notification received from the target apparatus 10, a user ID of the user receiving a service from the target apparatus 10, and the current position of the vehicle 20, to the settlement apparatus 30 (S204).

Next, the settlement processing unit 302 of the settlement apparatus 30 accesses the target apparatus information 353*a* by using the target apparatus ID included in the settlement request notification as key information, and thus acquires information indicating an installation place of the target apparatus 10. Next, the settlement processing unit 302 collates the current position of the vehicle 20 included in the settlement request notification with the installation place of the target apparatus 10, and determines whether or not the current position of the vehicle 20 is within a predetermined range from the installation place of the target apparatus 10 (S205). The settlement processing unit 302 determines that authentication of the target apparatus 10 fails in a case where the current position of the vehicle 20 is not within the predetermined range from the installation place of the target apparatus 10, and determines that authentication of the target apparatus 10 is successful in a case where the current position of the vehicle 20 is within the predetermined range.

A process procedure of step S206 is the same as the process procedure of step S105 in FIG. 5, and thus a description thereof will not be repeated.

In a case where authentication of the target apparatus 10 fails or the user does not have a payment ability for the amount of charge, the communication unit 301 of the settlement apparatus 30 transmits an authentication failure notification indicating that authentication fails or a settlement impossible notification indicating that settlement is not possible, to the vehicle 20 (S207). Next, the communication unit A 202 of the vehicle 20 transmits the authentication failure notification or the settlement impossible notification to the target apparatus 10 (S208). When the target apparatus 10 receives the authentication failure notification or the settlement impossible notification, the target apparatus 10 finishes the process without discharging an article to the takeout port. Even in a case where the authentication failure notification is received from the settlement apparatus 30, the communication unit A 202 of the vehicle 20 may transmit the settlement impossible notification to the target apparatus 10. Even in a case where the target apparatus 10 cannot recognize the authentication failure notification, authentication of the target apparatus 10 may be performed on the background.

In a case where authentication of the target apparatus 10 is successful and the user has a payment ability for the amount of charge, the communication unit 301 of the settlement apparatus 30 transmits a notification indicating that the authentication has been completed and settlement is possible to the vehicle 20 (S209). Next, the communication unit A 202 of the vehicle 20 transmits the notification that the authentication has been completed and settlement is possible to the target apparatus 10 (S210).

In the process procedures of step S209 and step S210, completion of authentication may not be explicitly shown in each notification. For example, transmission of the settlement possible notification to the target apparatus 10 (or the vehicle 20) from the vehicle 20 (or the settlement apparatus 30) in step S209 (or step S210) may implicitly indicate completion of authentication. Process procedures of step S211 to step S215 are respectively the same as the process procedures of step S110 to step S114 in FIG. 5, and thus descriptions thereof will not be repeated.

As mentioned above, in the process procedures described with reference to FIG. 6, a common authentication key between the target apparatus 10 and the settlement apparatus 30 may be held, and the target apparatus 10 may encrypt settlement information to be transmitted to the vehicle 20 in the process procedure of step S203. In the process procedure of step S204, the vehicle 20 may transmit the encrypted settlement information to the settlement apparatus 30 without changing the settlement information. Consequently, it is possible to suppress wrongdoing to rewrite an amount of charge included in settlement information in the vehicle 20 due to illegal alteration of the vehicle 20.

In this case, in the process procedure of step S209, the settlement apparatus 30 may cause an amount of charge to be included in a settlement possible notification, and the UI unit 205 of the vehicle 20 may display the amount of charge on a screen of the vehicle 20. In a case where the UI unit 205 accepts input of a result of checking that the amount of charge is accurate from the user, and input of the amount of charge being accurate in the UI unit 205 is received, the communication unit A 202 may transmit a settlement possible notification to the target apparatus 10.

In the process procedures described with reference to FIGS. 5 and 6, the process procedure of step S113 (or step S214) may be performed instead of the process procedure of step S105 (or step S206). In other words, in a case where the vehicle 20 and the target apparatus 10 are notified of completion of settlement instead of the vehicle 20 and the target apparatus 10 being notified of a result of checking that a user has a payment ability, and the target apparatus 10 is notified of completion of settlement, the target apparatus 10 may discharge an article (S110 and S211).

Figure 7:
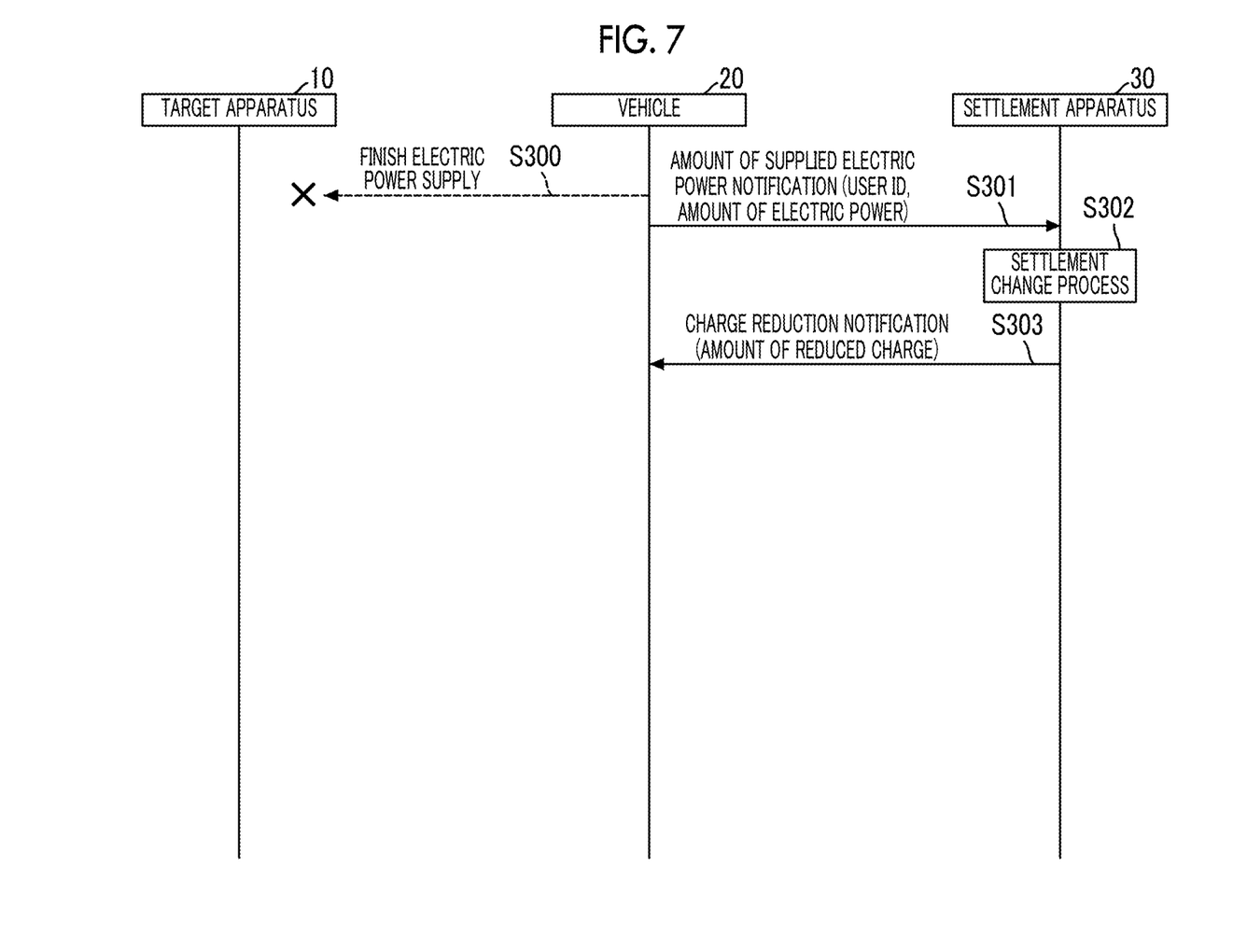
FIG. 7 is a sequence diagram illustrating an example of a process procedure of when the supply of power is finished.

FIG. 7 is a sequence diagram illustrating an example of a process procedure of when the supply of electric power is finished. First, the user decouples the cable C from the target apparatus 10 (S300). Consequently, the supply of electric power to the target apparatus 10 is stopped, and thus an operation of the target apparatus 10 is finished. Next, the supplied electric power management unit 204 of the vehicle 20 calculates an amount of electric power supplied to the target apparatus 10 from coupling of the cable C to the target apparatus 10 to decoupling thereof from the target apparatus 10. Next, the communication unit B 203 of the vehicle 20 transmits a notification including the calculated amount of electric power and the same user ID as the user ID sent to the settlement apparatus 30 in the process procedure of step S104 in FIG. 5, to the settlement apparatus 30 (S301).

The settlement processing unit 302 of the settlement apparatus 30 changes the amount of charge (settlement amount) charged to the user, settled in step S113 in FIG. 5 or step S214 in FIG. 6, to an amount of money obtained by subtracting an amount of money corresponding to the amount of electric power from the amount of charge (S302). Next, the settlement processing unit 302 notifies the vehicle 20 of the changed amount of charge (S303).

As mentioned above, according to the process procedures described with reference to FIG. 7, it is possible to give an incentive to a user having supplied electric power to the target apparatus 10.

CONCLUSION

According to the embodiment described above, the vehicle 20 has the aspect that can supply electric power to the target apparatus 10, and thus it is possible to provide a vehicle capable of supplying electric power to an external apparatus. Since the vehicle 20 performs communication with the target apparatus 10 and the settlement apparatus 30, it is possible to charge value for a service received by a user from the target apparatus 10, to the user.

The embodiment has been described to easily understand the present disclosure, and is not intended to limit the present disclosure. The flowchart, the sequence, each element of the embodiment, and disposition, a material, a condition, a shape, and a size of the element are not limited to those exemplified, and may be changed as appropriate. Configurations described in different embodiments may be partially replaced or combined with each other.

What is claimed is:

1. A vehicle comprising:
a supply unit configured to supply electric power to a target apparatus;
a first reception unit configured to receive settlement information including an amount of charge to be charged to a user as value for a service provided to the user by the target apparatus, from the target apparatus that is being supplied with the electric power;
a first transmission unit configured to transmit the acquired settlement information and a user identifier for specifying the user to a settlement apparatus;
a second reception unit configured to receive a notification indicating that settlement of the amount of charge is possible or settlement of the amount of charge has been completed from the settlement apparatus; and
a second transmission unit configured to transmit information indicating that settlement of the amount of charge is possible or settlement of the amount of charge has been completed to the target apparatus so as to cause the target apparatus to execute the service in a case where the notification is received.

2. The vehicle according to claim 1, further comprising a position acquisition unit configured to acquire a current position of the vehicle in a case where the electric power is supplied to the target apparatus, wherein:
the first transmission unit further transmits the current position of the vehicle to the settlement apparatus;
the second reception unit further receives, from the settlement apparatus, a notification indicating that authentication of the target apparatus has been completed when a preregistered installation position as an installation position of the target apparatus and the current position of the vehicle are within a predetermined distance; and
the second transmission unit further transmits information indicating that settlement of the amount of charge is possible or settlement of the amount of charge has been completed to the target apparatus in a case where the notification indicating that authentication of the target apparatus has been completed is received.

3. The vehicle according to claim 1, further comprising a management unit configured to count an amount of the electric power supplied to the target apparatus so as to receive the service from the target apparatus,
wherein the first transmission unit notifies the settlement apparatus of the counted amount of the electric power supplied to the target apparatus.

4. The vehicle according to claim 3, wherein the settlement apparatus is notified of the amount of the electric power, and then the second reception unit receives, from the settlement apparatus, an amount of money obtained by subtracting an amount of money corresponding to the amount of the electric power supplied to the target apparatus from the amount of charge, as an amount of charge to be charged to the user.

5. The vehicle according to claim 1, wherein the target apparatus is a vending machine, and the service is to discharge an article selected by the user from the target apparatus.

6. A settlement system comprising:
a vehicle; and
a settlement apparatus configured to perform settlement, wherein:
the vehicle includes
a supply unit configured to supply electric power to a target apparatus,
a first reception unit configured to receive settlement information including an amount of charge to be charged to a user as value for a service provided to the user by the target apparatus, from the target apparatus that is being supplied with the electric power,
a first transmission unit configured to transmit the acquired settlement information and a user identifier for specifying the user to the settlement apparatus,
a second reception unit configured to receive a notification indicating that settlement of the amount of charge is possible or settlement of the amount of charge has been completed from the settlement apparatus, and
a second transmission unit configured to transmit information indicating that settlement of the amount of charge is possible or settlement of the amount of charge has been completed to the target apparatus so as to cause the target apparatus to execute the service in a case where the notification is received; and the settlement apparatus includes
- a third reception unit configured to receive the settlement information and the user identifier from the vehicle, and
- a third transmission unit configured to compare the amount of charge included in the settlement information with a payment ability of the user corresponding to the user identifier, and transmits the notification indicating that settlement of the amount of charge is possible or settlement of the amount of charge has been completed to the vehicle in a case where the user has an ability to pay the amount of charge.

\* \* \* \* \*